No. 668,768. Patented Feb. 26, 1901.
W. A. BRADLEY.
VEHICLE STARTER, BRAKE, AND POWER STORING DEVICE.
(Application filed Oct. 11, 1900.)
(No Model.) 3 Sheets—Sheet I.

Witnesses:
Harry H. Weinstock.
Allen G. Fraser.

Walter A. Bradley, Inventor.
By Neuhart & Burkhart,
Attorneys.

No. 668,768. Patented Feb. 26, 1901.
W. A. BRADLEY.
VEHICLE STARTER, BRAKE, AND POWER STORING DEVICE.
(Application filed Oct. 11, 1900.)
(No Model.) 3 Sheets—Sheet 2.

Walter A. Bradley, Inventor.
Harry H. Weinstock.
Allen G. Fraser. Witnesses.
By Neuhart & Burkhart, Attorneys.

No. 668,768. Patented Feb. 26, 1901.
W. A. BRADLEY.
VEHICLE STARTER, BRAKE, AND POWER STORING DEVICE.
(Application filed Oct. 11, 1900.)
(No Model.) 3 Sheets—Sheet 3.
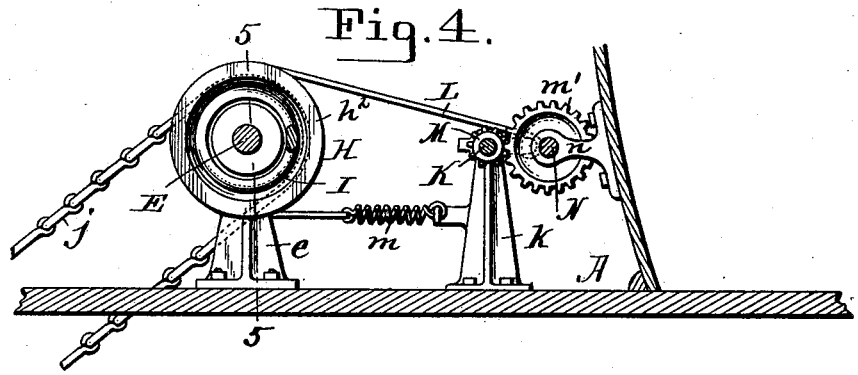
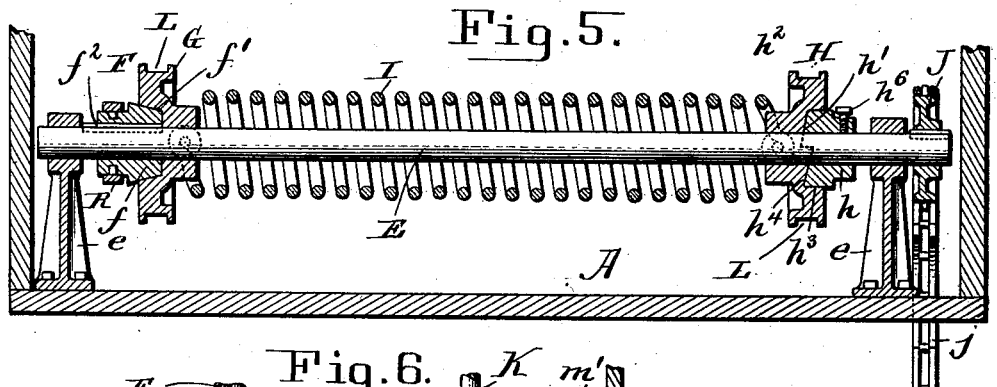
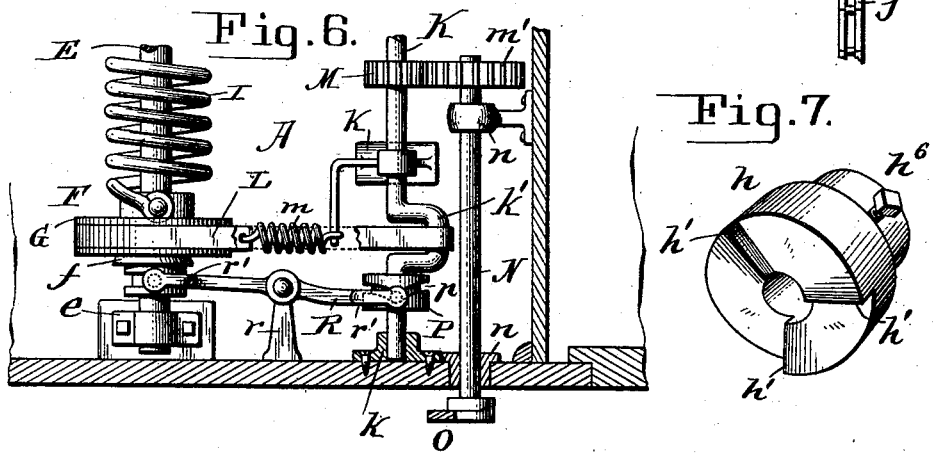
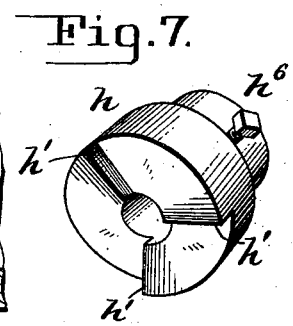
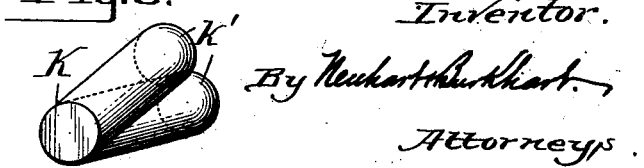
Witnesses:
Harry H. Weinstock.
Allen G. Fraser.
Walter A. Bradley,
Inventor.
By Neukart & Burkhart,
Attorneys.
THE NORRIS PETERS CO., PHOTO-LITHO., WASHINGTON, D. C.

UNITED STATES PATENT OFFICE.

WALTER A. BRADLEY, OF BUFFALO, NEW YORK, ASSIGNOR OF ONE-HALF TO HENRY KOONS, OF SAME PLACE.

VEHICLE STARTER, BRAKE, AND POWER-STORING DEVICE.

SPECIFICATION forming part of Letters Patent No. 668,768, dated February 26, 1901.

Application filed October 11, 1900. Serial No. 32,712. (No model.)

*To all whom it may concern:*

Be it known that I, WALTER A. BRADLEY, a citizen of the United States, residing at Buffalo, in the county of Erie and State of New York, have invented a new and useful Vehicle Starter, Brake, and Power-Storing Device, of which the following is a specification.

My invention relates to an improved vehicle starter, brake, and power-storing device; and its objects are to construct a device designed to store the energy due to the arrest of the forward movement of the vehicle, to release the power thus stored to assist the vehicle to travel forward or compel it to travel backward, to permit the power stored to remain so stored and allow the vehicle to proceed independent of said stored power, which may be released at any time desired—for instance, in assisting the vehicle to ascend an elevation or incline—and it is further designed to permit the vehicle to be stopped instantly without storing the energy due to the arrest of the forward movement of the vehicle, these various attainments being achieved by the manipulation of a single lever.

With these objects in view the invention consists in certain novel and peculiar features of construction and combination of parts, as will be hereinafter described and claimed.

In order that the invention may be fully understood, I will now describe it with reference to the accompanying drawings, in which like letters of reference refer to like parts in the several figures.

Figure 1:
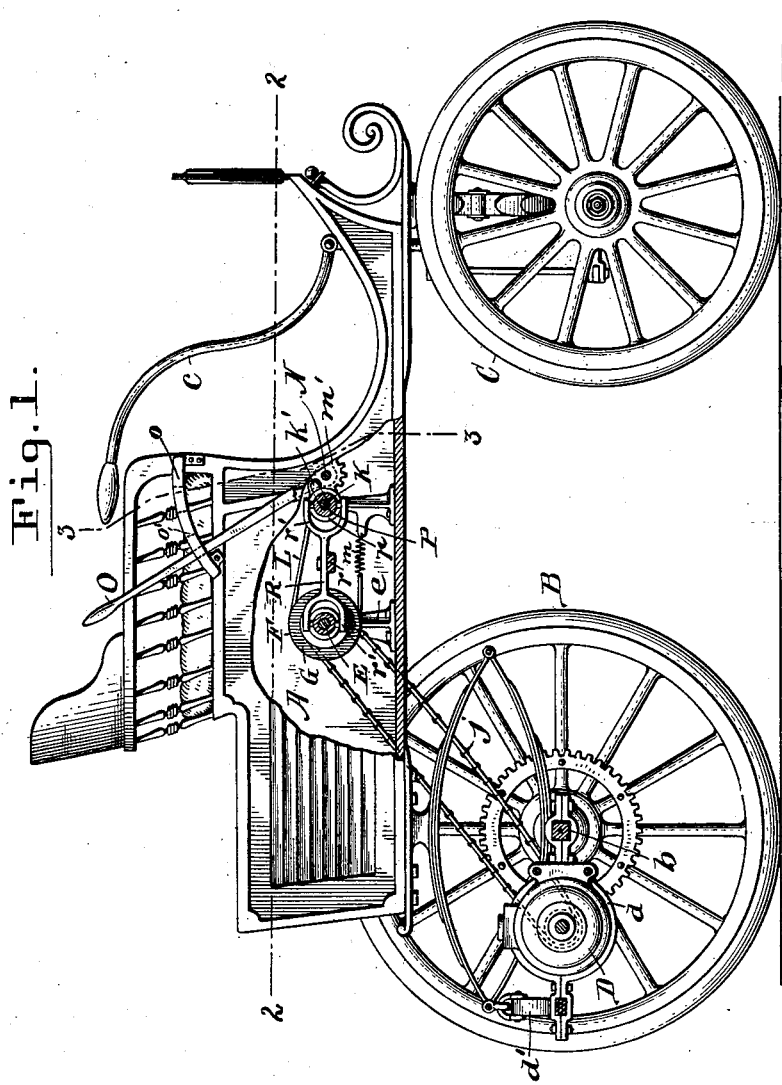
Figure 2:
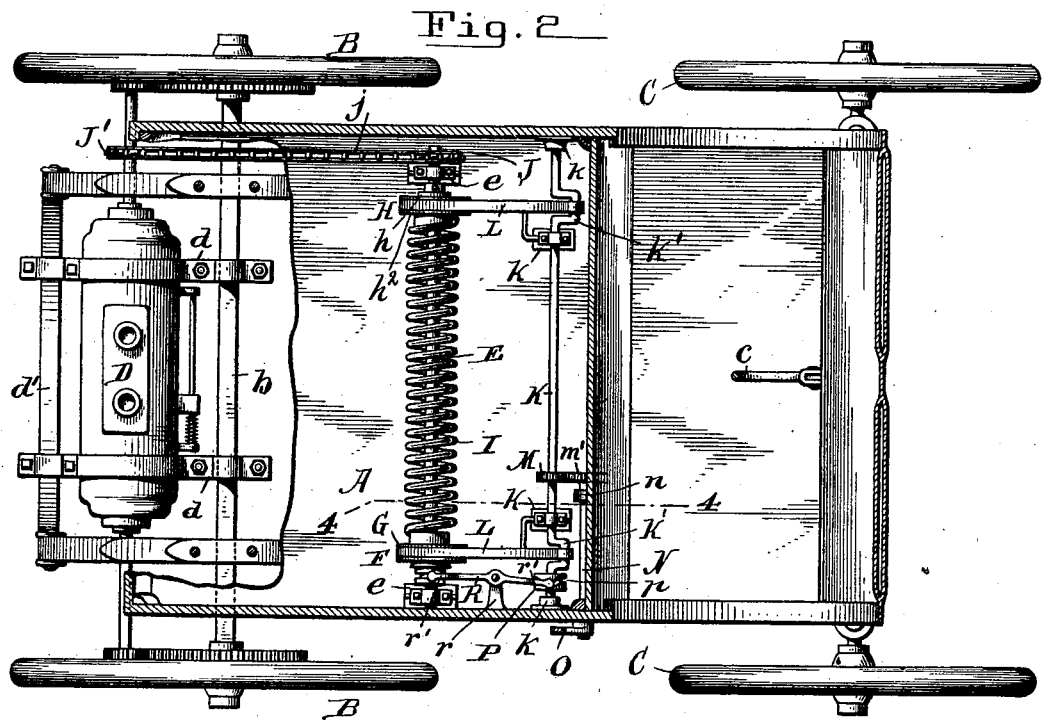
Figure 3:
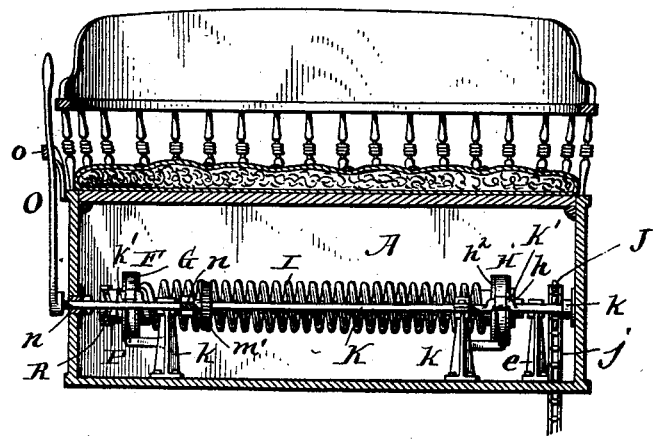

Figure 1 is a sectional elevation of a motor-vehicle having my invention applied thereto. Fig. 2 is a horizontal section taken on line 2 2, Fig. 1, a portion of the vehicle-body being broken away to show the connection between the motor or engine and the vehicle-starter. Fig. 3 is a section taken on line 3 3, Fig. 1. Fig. 4 is an enlarged longitudinal section taken on line 4 4, Fig. 2. Fig. 5 is a transverse section taken on line 5 5, Fig. 4. Fig. 6 is a top plan view of one end of the device. Fig. 7 is a detached perspective view of the inner part of the ratchet-clutch. Fig. 8 is an end view of the crank-shaft wherewith the friction-clutch and brakes are controlled and operated.

The mechanism forming my device is preferably located in the body A of the vehicle and connected to the motor or engine by a sprocket-chain or other suitable transmission; but it may be as readily applied to the axle if made to revolve with the driving-wheels, thus avoiding the necessity of a chain.

This invention if applied to a motor-vehicle propelled by gasolene will allow the engine to be stopped whenever the vehicle is stopped, thus saving fuel and lengthening the life of the engine, the energy due to the arrest of the forward movement of the vehicle being stored, which can be released when desired to start the vehicle. The device being geared to the engine-shaft will cause the same to revolve, and the explosion of gas in the gas-chamber of the engine will cause the engine to propel the vehicle after the power has been released. Heretofore gas-engines were compelled to run when the vehicle was stopped and mechanism had to be provided to disengage the same from the driving-wheels, as otherwise it would be necessary to start the engine by hand each time before starting.

B represents the driving-wheels, mounted to revolve on the axle $b$, and C represents the steering-wheels, which may have connection with the steering-lever $c$ in any suitable manner.

D represents the motor or engine, which may be supported on the vehicle in any suitable manner; but, as shown in the drawings, it is carried in straps $d$, the front ends of which are secured to the axle $b$ in a manner to permit the same to swing thereon, the rear ends being fastened to a spring $d'$, the engine or motor having a driving-shaft which is geared to the driving-wheels B, causing them to revolve on the axle.

As illustrated in the drawings, my vehicle-starter or power-storing device consists of a shaft E, positioned in the body A of the vehicle parallel with the motor or engine shaft and journaled in supports or standards $e$, secured to the bottom of the vehicle-body. A friction-clutch F is carried on the shaft and consists of an inner section or cone $f$, which enters a correspondingly-shaped socket $f'$, formed in a drum or disk G, which forms the outer section of the clutch. The inner section or cone $f$ is secured to the shaft by means of a key $f^2$, which causes it to turn with the shaft, but permits it to slide thereon, while the outer section G is loosely mounted on the shaft and only revolves with the same when in engagement with the cone $f$. If desired, any other well-known clutch may be substituted for the clutch just described.

H represents a ratchet-clutch which is carried on the opposite end of the shaft E. This clutch comprises an inner section $h$, having ratchet-teeth $h'$, and an outer section $h^2$. The inner section $h$ enters a socket $h^3$, formed in the outer section, which is slightly larger than said inner section, so as to allow the same to turn freely therein, and it is provided with ratchet-teeth $h^4$, formed on its inner end, which are adapted to coact or engage with the teeth $h'$ only when the shaft revolves in one direction. The inner section $h$ is secured to the shaft E by means of a set-screw $h^5$ or in any other well-known manner, and the outer section $h^2$ is loosely mounted on the shaft. This permits the inner section $h$ to revolve with the shaft E in one direction without revolving the outer section $h^2$, but compels said outer section to revolve with the inner section and shaft when the latter revolves in the opposite direction. It is to be understood that any other clutch may be used which is operatively connected only when the shaft revolves in one direction. A coiled spring I surrounds the shaft E and has one end secured to the loosely-mounted member of the clutch F and its other end secured to the loosely-mounted member of the clutch H.

J represents a sprocket-wheel secured to one end of the shaft E, and $j$ is a sprocket-chain which connects said sprocket-wheel with a sprocket-wheel J', secured to the motor or engine shaft.

Parallel with and a short distance in advance of the shaft E is a crank-shaft K, which is journaled in bearings or supports $k$, secured to the vehicle-body. This crank-shaft has two cranks $k'$, disposed at different angles and formed thereon in line with the loosely-mounted members of the clutches, which latter also serve as brake-pulleys and are surrounded by brake-bands L, having one of their ends secured to said cranks and their opposite ends to tension-springs $m$, which are secured to the supports $k$ or any other fixed points.

M represents a pinion which is secured to the crank-shaft K and meshes with a spur-wheel $m'$, secured to a rock-shaft N, parallel to and slightly in advance of the crank-shaft. This rock-shaft is journaled in bearings $n$, secured to the vehicle-body, and has the operating-lever O secured thereto. The object of this rock-shaft is to cause the cranks $k'$ to swing on a greater arc than the lever O, this being due to the intervention of the spur-wheel $m'$ and pinion M.

In some cases sufficient movement can be given to the lever O to permit it to be secured directly to the crank-shaft K, and in such cases the rock-shaft N, pinion M, and spur-wheel $m'$ can be dispensed with.

$o$ represents a segment or tooth rack having four teeth or notches $o'$, as shown in dotted lines, Fig. 1, with one of which the operating-lever O is engaged after having operated the device to accomplish the desired result.

P represents a cam-pulley having an annular cam-groove $p$ formed thereon. A shifting lever R is pivoted about midway between its ends to a support $r$, fastened to the vehicle-body, each end thereof having a yoked portion $r'$, which embraces the hub of the cone $f$ and the cam-pulley P, respectively, each yoke having inwardly-projecting pins which enter the cam-groove $p$ and the annular groove $f^3$, formed in the hub of the cone $f$.

The operation of the device is as follows: When the lever O engages the first notch or is in its first position, as shown in Fig. 1, the brake-band surrounding the ratchet-clutch is drawn tightly around the same, while the brake-band around the friction-clutch is loose. This is caused by the crank in line with the ratchet-clutch being positioned in advance of the crank in line with the friction-clutch, or, in other words, the first-mentioned crank is nearer the "dead-center" with reference to the line of the brake-bands than the latter. The cone $f$ is engaged with the disk or loosely-mounted member G, and the shaft E is revolved by the motor or engine through the medium of the sprocket-chain $j$. The inner section of the ratchet-clutch rides over the outer section and does not operate the same, while the outer section is held by the brake-band. The two parts of the friction-clutch being engaged causes it to turn with the shaft, whereby the adjacent end of the spring is wound up. After the spring has been wound up and the motor or engine stopped the vehicle may be propelled backwardly by the power stored in the spring by simply leaving the lever in the position described, when the spring will unwind and release the power at the same end. By shifting the lever O to the second notch or position the parts above described remain the same, except that the brake-band around the friction-clutch is also drawn tight. This was accomplished by the cranks $k'$ swinging nearer the dead-center, thereby tightening the brake-band around the friction-clutch and causing the spring $m$, secured to the brake-band surrounding the ratchet-clutch, to be placed under tension. This stops or brakes the vehicle instantly without storing power in the spring or when power is stored, depending on the position in which the lever O was last placed. A further forward movement of the lever O positions the same in its third position, which causes the cam-pulley to shift the shifting lever R, which in turn shifts the cone $f$ on the shaft E and disengages it from the disk or loosely-mounted member G, the other parts remaining the same as described in the second position. During this movement of the lever O the crank in line with the ratchet-clutch was swung beyond the dead-center, but not sufficient to loosen the brake-band attached thereto, but simply to reduce the tension of the spring m, secured to said band, and the crank in line with the friction-clutch was swung nearer the dead-center, thereby placing the spring secured to its attached brake-band under tension. This permits the shaft E to revolve free without imparting movement to the power-spring or loosely-mounted members of the clutches, which are held from turning by the brake-bands and which may be held with power stored or without power stored, depending on the position in which the lever O was last placed. A further forward movement of the lever O brings the same in engagement with the fourth tooth or notch on the segment o and releases the brake-band around the ratchet-clutch, the parts otherwise remaining the same as described in the third position. This movement of the lever O swings the crank in line with the friction-clutch beyond the dead-center, not far enough, however, to loosen the brake-band, but simply to reduce the tension on the spring attached thereto. Said movement of the lever O also swings the crank in line with the ratchet-clutch sufficiently beyond the dead-center to release or loosen its attached brake-band. This permits the end of the spring adjacent to the ratchet-clutch to unwind and revolve the loosely-mounted member of said clutch in the direction to engage the secured member thereof, whereby the shaft E is revolved and starts the engine or motor, if stopped, or assists the same when running.

The operating-lever O may be swung from one position to any other as occasion may require, when the desired result may be obtained.

The arrangement of the parts comprising this invention may be greatly varied according to its use and the form of the vehicle to which it is attached, and I do not wish to be understood as confining myself to the particular construction or use of this device, as it may be used in connection with a stationary gas-engine, large sizes of which are generally provided with an automatic starting device. This device is very desirable for the purpose just mentioned, since the power can be stored and held so stored for any length of time.

Having thus described my invention, what I claim is—

1. The combination with the shaft, of a power-storing element, controllable mechanism for storing power by the revolving of said shaft and whereby said stored power may be held and the shaft allowed to revolve independent thereof, or whereby the shaft may be caused to revolve in either direction by said stored power, substantially as set forth.

2. The combination with the shaft, of a power-spring surrounding the same, a controlling or operating lever, and mechanism intermediate of said operating-lever and the power-spring whereby the latter is caused to be wound up to store power by the revolving of said shaft, whereby said stored power may be held and the shaft allowed to turn independent thereof, whereby said stored power may be released to cause the shaft to revolve in either direction, and whereby the shaft may be held from revolving, all being attained by the movement of said operating-lever, substantially as set forth.

3. The combination with the shaft, of clutches carried on said shaft, a power-spring surrounding said shaft and having its ends secured to said clutches, an operating-lever, and mechanism intermediate of said operating-lever and the clutches whereby either one or both clutches may be operated to store power, to hold the power so stored, to release the power so as to cause the shaft to revolve in either direction, or to brake the shaft and prevent its revolving, substantially as set forth.

4. The combination with the shaft, of a power-spring surrounding the same, and controllable mechanism whereby said spring can be wound up to store power by the revolving of said shaft, and whereby said stored power may be held independent of the revolving of said shaft, substantially as set forth.

5. The combination with the shaft, of a power-spring surrounding the same, and controllable mechanism whereby said spring may be wound up, or whereby the shaft may be held from revolving without changing the condition of said spring, substantially as set forth.

6. The combination with the shaft, of a power-spring surrounding the same, controllable mechanism whereby said spring is caused to be wound up by the revolving of said shaft and whereby the latter may be caused to revolve in either direction by the unwinding of said spring, substantially as set forth.

7. The combination with the shaft, of a clutch carried on the shaft and arranged to operatively connect or engage only when the shaft revolves in one direction, a second clutch carried on the shaft a distance from the aforesaid clutch, a power-spring surrounding said shaft and having its ends secured to said clutches, a shifting lever for operating the second-mentioned clutch, means for operating said shifting lever, and mechanism whereby either one or both of the loosely-mounted members of said clutches are held from turning, substantially as set forth.

8. The combination with the shaft, of a clutch carried by the shaft consisting of a loosely-mounted member and a secured member and being arranged to operatively engage only when the shaft revolves in one direction, a second clutch carried on the shaft consisting of a loosely-mounted member and a secured but slidable member, a power-spring having its ends secured to said loosely-mounted members of the clutches, means for engaging or disengaging said second clutch, mechanism whereby either one or both of the loosely-mounted members of said clutches are held from turning, and an operating-lever whereby the device is operated, substantially as set forth.

9. The combination with the shaft, of a clutch carried on the shaft consisting of a loosely-mounted member and a secured member and being arranged to operatively engage only when the shaft revolves in one direction, a second clutch carried on the shaft and consisting of a loosely-mounted member and a secured but slidable member, a power-spring surrounding said shaft and having its ends secured to the loosely-mounted members of said clutches, an operating-lever, a crank-shaft operated by said lever, a cam-pulley secured to said crank-shaft, a shifting lever operated by said cam-pulley and adapted to engage and disengage said second-mentioned clutch, and brake-bands encircling the loosely-mounted members of said clutches, said brake-bands having one end fixed and the other end secured to the cranks of the crank-shaft, substantially as set forth.

10. The combination with the shaft, of clutches carried thereon, a power-spring surrounding said shaft and having its ends secured to the loosely-mounted members of said clutches, an operating-lever, a crank-shaft operated by said lever, means for engaging and disengaging the loosely-mounted members with the secured members of said clutches, brake-bands surrounding said loosely-mounted members and having connection at one end with the cranks of the crank-shaft, and springs rigidly secured at one end and having connection at the other end with the opposite ends of the brake-bands, as set forth.

11. The combination with the shaft, of clutches carried thereon, one of said clutches being arranged to operatively engage or connect only when the shaft revolves in one direction, means for engaging and disengaging the other clutch, an operating-lever, a crank-shaft having two cranks disposed at different angles, and brake-bands passing around the loosely-mounted members of said clutches and having one of their ends secured to said cranks, and their opposite ends yieldingly connected to fixed objects, substantially as set forth.

WALTER A. BRADLEY.

Witnesses:
ALLEN G. FRASER,
HARRY H. WEINSTOCK.